United States Patent
Finkenzeller et al.

(10) Patent No.: US 9,098,734 B2
(45) Date of Patent: Aug. 4, 2015

(54) SYSTEM AND METHOD FOR THE PRESENCE RECOGNITION OF A SECOND PORTABLE DATA CARRIER BY A FIRST PORTABLE DATA CARRIER

(75) Inventors: Klaus Finkenzeller, Unterfohring (DE); Gisela Meister, Munich (DE)

(73) Assignee: GIESECKE & DEVRIENT GMBH, Munich (DE)

( * ) Notice: Subject to any disclaimer, the term of this patent is extended or adjusted under 35 U.S.C. 154(b) by 280 days.

(21) Appl. No.: 13/636,557

(22) PCT Filed: Mar. 25, 2011

(86) PCT No.: PCT/EP2011/001524
§ 371 (c)(1),
(2), (4) Date: Sep. 21, 2012

(87) PCT Pub. No.: WO2011/120662
PCT Pub. Date: Oct. 6, 2011

(65) Prior Publication Data
US 2013/0009752 A1    Jan. 10, 2013

(30) Foreign Application Priority Data
Mar. 29, 2010    (DE) .......................... 10 2010 013 203

(51) Int. Cl.
*H04Q 5/22*    (2006.01)
*G06K 7/00*    (2006.01)
*G06K 19/07*    (2006.01)

(52) U.S. Cl.
CPC .......... *G06K 7/0008* (2013.01); *G06K 19/0723* (2013.01)

(58) Field of Classification Search
CPC . G06K 7/01; G06K 7/10366; G06K 19/0723; G06K 7/0008; G06K 7/10297; G06K 7/10009; G06K 7/10336; G06K 7/10316; G06K 7/10356; G08B 25/10; G08B 25/016; G08B 21/0269; G08B 21/02; G08B 21/245; G08B 13/2434
USPC .............. 340/5.81, 10.1–10.6, 539.1–539.25, 340/572.1–573.1; 235/439
See application file for complete search history.

(56) References Cited

U.S. PATENT DOCUMENTS 7,150,407 B1    12/2006    Berger et al.
2002/0014529 A1    2/2002    Tanaka
(Continued)

FOREIGN PATENT DOCUMENTS

CN    1662925 A    8/2005
DE    202005014750 U1    11/2005
(Continued)

OTHER PUBLICATIONS

International Search Report for PCT/EP2011/001524, Jul. 5, 2011.
International Preliminary Examination on Patentability in PCT/EP2011/001524 Oct. 11, 2012, 9 pages.

*Primary Examiner* — George Bugg
*Assistant Examiner* — Sharmin Akhter
(74) *Attorney, Agent, or Firm* — Workman Nydegger

(57) ABSTRACT

A system for recognizing the presence of a second portable data carrier by a first portable data carrier, wherein the data carriers have respectively a contactless interface with an antenna and an electronic circuit for storing and/or processing data. An RFID reading device supplies the data carriers with energy and for the respective communication of the data carriers with the reading device. In the first and the second data carrier there is respectively provided a further communication device, via which an additional, direct communication channel, independent of the field of the reading device, is made available between the first and the second data carrier, to thereby check the immediate presence of the second data carrier in the field of the reading device by the first data carrier.

15 Claims, 2 Drawing Sheets

(56) References Cited

U.S. PATENT DOCUMENTS

2010/0130127 A1* 5/2010 Takayama .................... 455/41.1
2011/0070833 A1* 3/2011 Perkins et al. ............... 455/41.1

FOREIGN PATENT DOCUMENTS

DE 102004058165 A1 6/2006
DE 102007022943 A1 11/2008

* cited by examiner

SYSTEM AND METHOD FOR THE PRESENCE RECOGNITION OF A SECOND PORTABLE DATA CARRIER BY A FIRST PORTABLE DATA CARRIER

BACKGROUND OF THE INVENTION

A. Field of the Invention

The invention relates to systems for the presence recognition of a second portable data carrier by a first portable data carrier.

B. Related Art

When using an electronic health card, in certain application cases it is necessary to determine the presence of a doctor before data of the electronic health card can be accessed. To determine and check the presence of a doctor, between a patient's electronic health card (a portable data carrier) and the doctor's so-called health professional card (also in the form of a portable data carrier) an authentication must be carried out. This authentication is initiated by a terminal, with which the electronic health card and the health professional card are in communicative connection, as a host. Subsequently, the authentication is effected via a security module (SMC-A) of the terminal, upon which the communication taking place within the framework of the authentication between electronic health card and health professional card must be tunnelled in the terminal. After effected authentication, the health professional card, however, can be removed unnoticedly, the authentication remaining valid and thus the electronic health card can be further accessed.

There is thus a need for presence recognition between two data carriers.

If several contactless data carriers, such as e.g. chip cards, are located in the response range of an RFID reading device, in particular according to ISO/IEC 14443 type A or type B, the reading device (i.e. the terminal) can set up with each of the contactless data carriers in the field of its antenna (so-called response range) a communication relation. A direct communication from data carrier to data carrier, however, is not possible, as the data carriers typically do not have means for detecting the load modulation of another data carrier. The possible realization of such a load modulation detector on a portable data carrier is additionally impeded by the usually employed modulation methods (ISO/IEC 14443: Load modulation with an auxiliary carrier at a frequency of 848 kHz). A communication from data carrier to data carrier is thus, according to the prior art, only unfavorably possible with involvement of the reading device.

From DE 10 2007 022 943 A1 as the closest prior art there is known a system consisting of a reading device and several data carriers. The reading device supplies all data carriers with energy via a contactless field. In order to make it possible for a data carrier to carry out a conflict-free direct communication with a second data carrier, the reading device is put into a wait mode by the first data carrier and the first data carrier into an active communication mode.

From DE 10 2004 058 165 there is known a contactless data carrier which has, in addition to a contactless data interface, for example on the basis of infrared or radio transmission, a receiving device for receiving energy which is contactlessly transmitted separate from the data. This embodiment aims to achieve that also a portable data carrier which has no or no sufficient own energy source can carry out a contactless data transmission for which a comparatively high amount of energy is required. In particular, to the portable data carrier there are to be opened up transmission techniques for the contactless data transmission, which otherwise are less well suited for a contactless energy transfer.

It is the object of the present invention to state systems which make possible a simple presence recognition between two portable data carriers.

SUMMARY OF THE DISCLOSURE

The invention creates a first system for the presence recognition of a second portable data carrier by a first portable data carrier, which respectively comprise a contactless interface with an antenna and an electronic circuit for storing and/or processing data. The system further comprises according to this first embodiment variant an RFID reading device, around the antenna of which there is formed, in operation, a field within which the reading device supplies present contactless data carriers via their respective antennas with energy and/or via which a communication connection can be set up. In the first and the second data carrier there is respectively provided a further communication means, via which an additional, direct communication channel, independent of the field of the reading device, can be made available between the first and the second data carrier, in order to be able to check the immediate presence of the second data carrier in the field of the reading device by the first data carrier.

The first system according to the invention makes possible a direct communication between the first and the second data carrier while circumventing the RFID reading device. In so doing, there can be reliably determined the presence of the second portable data carrier by the first portable data carrier, by the direct communication channel between the two data carriers being employed. In particular, the system according to the invention for presence recognition can be realized in a simple and cost effective manner, as the portable data carriers used therefor must only be changed insofar as these must be provided with a further communication means for making available the direct communication channel.

In an expedient embodiment of the first system for presence recognition, the further communication means of the first and second data carrier comprises an optical transceiver which in particular is configured for sending and receiving data in the infrared range. Alternatively, the further communication means of the first and second data carrier is configured for sending and receiving electromagnetic signals on a frequency which is different from the frequency of the reading device. In particular, for the direct communication channel between the further communication means of the first and second data carrier frequencies in the UHF frequency range, e.g. 865 MHz or 2.45 GHz are suitable. Antennas necessary therefor can be easily realized.

In accordance with a further concretization of the system according to the invention for presence recognition of the first alternative, the reading device is based on the ISO/IEC 14443 standard and preferably works in a frequency range of 13.56 MHz.

It is further expedient, when the first data carrier has a communication relation to the reading device and the second data carrier obtains at least energy from the field of the reading device. A communication relation of the second data carrier to the reading device, however, is not necessary. The communication relation between the reading device and the first data carrier relates for example to carrying out a certain, specified action (e.g. reading data stored in the first data carrier) or a certain command, the physical presence of the second data carrier being necessary for carrying out the action or command.

To permit recognition, whether after an initial setup of the direct communication channel between the further communication means of the first and second data carrier, this channel further exists or has been cancelled (consciously or unconsciously), it is expedient when there is provided a multiple, in particular a periodic, communication between the first data carrier and the second data carrier via the direct communication channel.

The invention, besides, creates a second system for the presence recognition of a second portable data carrier by a first portable data carrier, each of which comprise a contact-type interface and an electronic circuit for storing and/or processing data. The first data carrier additionally comprises a contactless interface operable parallel to the contact-type interface. The second data carrier additionally comprises an NFC interface. The system further comprises a reading device with two contact-type interfaces, via which the data carriers can be supplied with energy and on account of the spatial arrangement via the NFC interface of the second data carrier a wireless, direct communication connection to the contactless interface of the first data carrier is establishable, in order to be able to check the immediate presence of the second data carrier by the first data carrier.

NFC (near field communication) is a transmission method by means of magnetic fields in the frequency range of 13.56 MHz. The typical range of NFC devices is about 20 cm. The methods used for data transmission are very similar to those of contactless data carriers. NFC devices are therefore also able to communicate with contactless data carriers or to simulate a contactless data carrier, by a load modulation being generated. NFC is specified in the ISO/IEC 18092 standard. The second data carrier, which in addition to its contact-type interface has an NFC interface is operable in the operating modes "card emulation", "reader emulation" and "peer to peer" (P2P) for realizing the second system.

Also in this second, alternative system for the presence recognition of a second data carrier by a first data carrier there is used a direct communication channel between the two data carriers. The energy supply of the two data carriers in this second variant is effected via the contact-type interfaces of the data carriers. Involving the reading device in the communication for determining the presence recognition is also not necessary in this variant. The second variant of the system according to the invention for presence recognition has, moreover, the advantage that conventional, known reading devices and data carriers can be used.

According to an expedient embodiment of the second variant of the system according to the invention for presence recognition, the interfaces of the reading device are spatially arranged to each other in such a way that the main areas of the data carriers are arranged mutually parallel at a small distance. This ensures that the distance required for an NFC communication of a maximum of 20 cm is not exceeded and a good reception via the direct communication channel is given in the wireless communication.

Expediently, the second data carrier is based on the ISO/IEC 18092 standard, as a result of which the second data carrier has RFID reader functionality.

In accordance with a further expedient embodiment of the second variant of the system according to the invention, the first and the second data carrier are permanently supplied with energy through the reading device. The supply is effected here via the respective contact-type interfaces of the first and second data carrier.

In a further embodiment of the second variant of the system according to the invention an RFID read signal is generatable at least once, in particular multiply, preferably periodically, or alternatively permanently for establishing the communication connection with the first data carrier. This makes it possible to carry out a check on presence, with which the presence of the respective other card can be securely determined. The multiple or permanent generation of the RFID read signal ensures that the spatial distance of the second data carrier is recognized by the first data carrier.

An embodiment variant relating to the first and second system according to the invention provides that the first data carrier is permitted to carry out specified commands and/or actions and/or to read and/or to write on certain memory regions only when the presence of the second data carrier could have been positively checked by the first data carrier. This ensures that the proper function of the first data carrier can be carried out only when the presence of the second data carrier is given. For example, reading data from a memory of the first data carrier and/or writing data in the memory of the first data carrier is possible only when the second data carrier is present.

In a further embodiment relating to both variants, a direct authentication between the first and the second data carrier, while circumventing the reading device, is provided. In particular, the authentication can be revocable, when the presence of the second data carrier could not have been positively checked by the first data carrier.

DESCRIPTION OF THE DRAWINGS

The invention will hereinafter be explained in more detail with reference to embodiment examples. There are shown.

DETAILED DESCRIPTION OF PREFERRED EMBODIMENTS OF THE INVENTION

Figure 1:
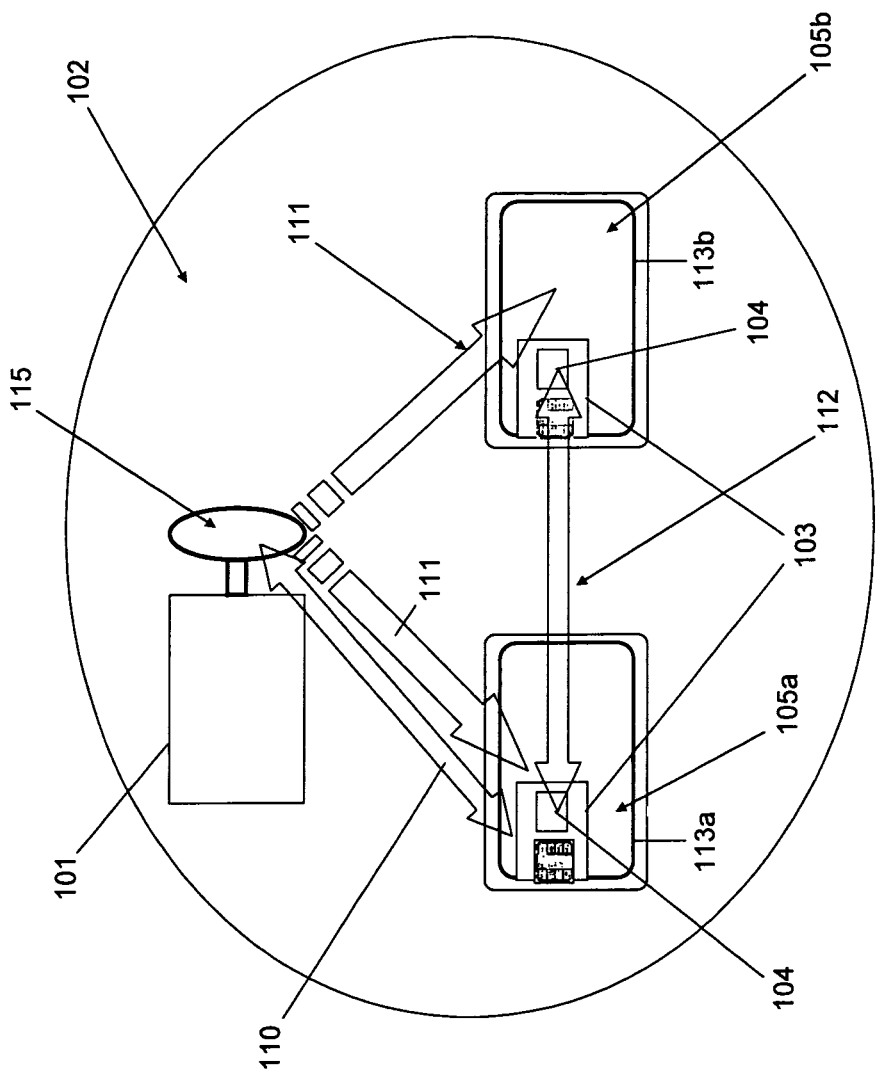
FIG. 1 a schematic representation of a first system according to the invention for the presence recognition of a second portable data carrier by a first portable data carrier, and FIG. 2 a schematic representation of a second system according to the invention for the presence recognition of a second portable data carrier by a first portable data carrier.

FIG. 1 shows in a schematic representation the structure of the system according to the invention for the presence recognition of a second portable data carrier 105b by a first portable data carrier 105a in a first variant. The system comprises an RFID reading device 101 (so-called terminal) as well as the at least two portable data carriers 105a, 105b configured as contactless chip cards.

The RFID reading device 101 works preferably in the frequency range of 13.56 MHz, particularly preferably according to the ISO/IEC 14443 standard. The RFID reading device 101 has an antenna 115. Around the antenna 115 there is formed a field 102 (also designated as response range), within which the reading device 101 supplies present contactless chip cards 105a, 105b with energy (reference sign 111) and/or can set up a communication relation 110.

The contactless chip cards 105a, 105b respectively have an antenna 113a, 113b for receiving energy from the field 102 of the RFID reading device 101. Moreover, these have a circuit 103 for storing and/or processing data, which is configured as a chip. The chip 103 controls, inter alia, the communication of the respective chip card with the RFID reading device 101, as well as of the chip cards 105a, 105b among each other. A communication taking place with the RFID reading device is effected wirelessly through the field 102.

Further, the contactless chip cards 105a, 105b and/or their chip 103 have an additional communication means 104. The further communication means 104 makes available an additional data communication channel 112 which is independent of the field 102 of the RFID reading device 101. The communication channel is therefore designated as a direct communication channel 112 between the chip cards 105a, 105b. The further communication means 104 consists for example of an optical sending/receiving unit (designated as transceiver) which particularly preferably works in the infrared range. The further communication means 104 can also be operated, however, on a frequency which is different from the frequency of the RFID device 101. For this purpose, in particular frequencies in the UHF frequency range, e.g. 856 MHz or 2.45 GHz, are suitable, because in this case the antennas required are easy to realize.

The mode of function of the system for presence recognition, represented in FIG. 1, is as follows:

If a chip card 105a, 105b reaches the field 102 of the RFID reading device 101, the respective chip card is supplied with energy and can set up a communication relation 110 to the RFID reading device 101.

According to the invention it is provided that the chip card 105a has set up in the field or response range 102 of the RFID reading device 101 a communication relation 110 to the RFID reading device 101 and for carrying out a certain action or a certain command would like to or must check the physical presence of the second chip card 105b. In so doing, the chip card 105b needs no immediate communication relation to the RFID reading device 101, receives, however, at least energy 111 from the response field 102 of the RFID reading device 101. It is further provided that the chip card 105a sets up with the help of its for example optical communication means 104 a direct communication relation 112 to the chip card 105b, so that it can check the immediate presence thereof in the field 102 or response range of the RFID reading device 101.

Here, it can be provided that the chip card 105a carries out certain commands and/or actions and/or can read and/or write on certain memory regions only when the presence of the second chip card 105b in the communication region of the direct communication channel 112 could have been proven, e.g. by an authentication.

Providing a respective further communication means 104 in the chip cards 105a, 105b makes possible for example a direct authentication between the chip cards 105a and 105b while circumventing the RFID terminal 101 and its security module (SMC-A). By a periodic polling it can be ensured here that the chip card 105b has not left the range of the field 102 of the RFID reading device 101. If the presence of the chip card 105b can no longer be determined by the chip card 105a, the authentication and thus the access authorization of the RFID reading device 101 to certain, specified data in the chip card 105a can be locked.

Figure 2:
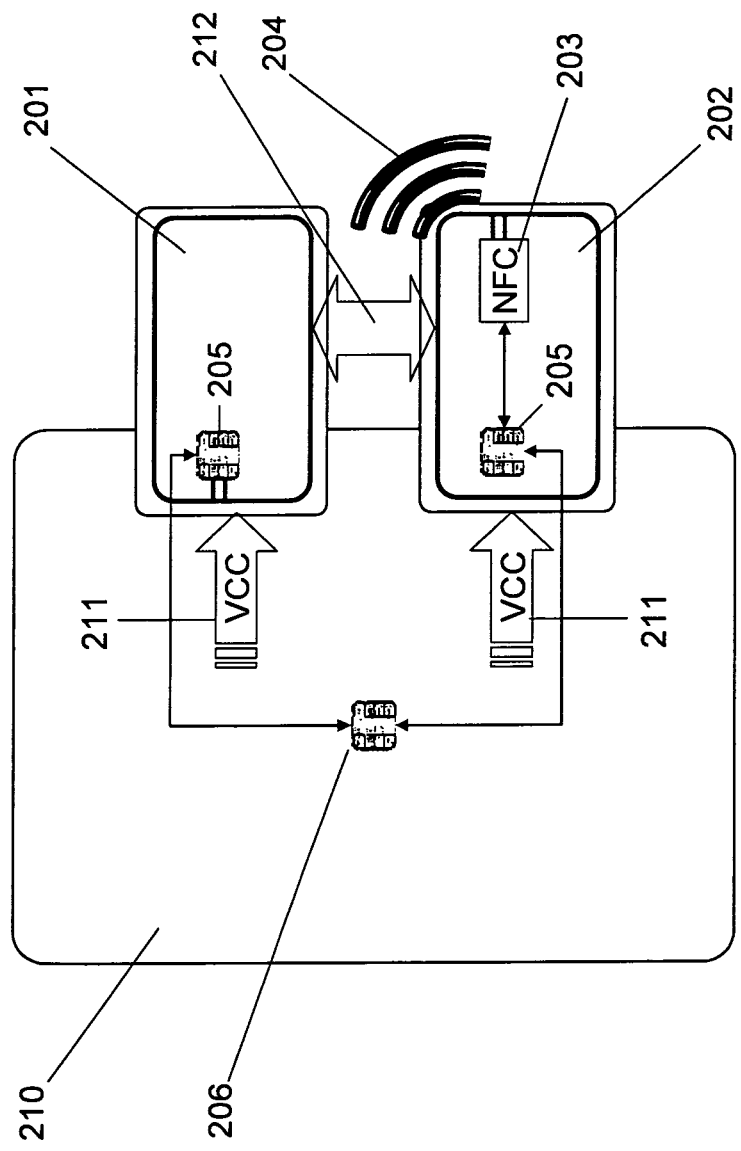

FIG. 2 shows a schematic representation of a system according to the invention for presence recognition according to a second variant. The system according to the invention of this variant consists of a reading device 210 with at least two contact-type interfaces (not shown). The system further comprises at least one NFC-capable data carrier 202 in the form of a chip card as well as at least one data carrier configured as a dual-interface chip card 201 also in the form of a chip card. The contact-type interfaces of the reading device 210 here are spatially arranged in such a way that the main areas of the chip cards 201 and 202 are arranged mutually parallel at a small distance. This makes possible a contactless communication between the two chip cards 201 and 202.

The chip card 201 is a dual-interface chip card according to the known prior art. The operating system (OS) of the chip card 201 here is designed such that the contactless interface in accordance with ISO/IEC 14443 and the contact-type interface in accordance with ISO/IEC 7816 can be operated parallel.

The chip card 202 is a chip card with an NFC interface, which is preferably configured according to ISO/IEC 18092, as a result of which the card also obtains an RFID reader functionality which is designated as NFC mode "being reader".

Each of the chip cards 201, 202 comprises an electronic circuit for storing and/or processing data in the form of a chip 205.

The energy or voltage supply is effected via the contact-type interfaces of the mentioned components. In The Figure, this is schematically designated with the reference sign 211. Via the contact-type interface, each of the chip cards 201, 202, further, can communicate with the reading device 210.

The mode of function of the system represented in FIG. 2 is as follows:

For the operation of the system, according to the invention, the chip card 202 having the NFC interface 203 as well as the dual-interface chip card 201 are inserted in the contact-type interfaces of the reading device 210 which has a security module 206. Via the reading device 210 the chip cards 201 and 202 are supplied (if possible permanently) with an operating voltage Vcc. As described, the reading device 210 can communicate with the two chip cards 201 and 202 in a contact-type way.

For carrying out a check on presence between the chip cards 201 and 202 it is provided that the chip card 202 having the NFC interface 203 generates at least once, preferably periodically, or alternatively permanently an RFID read signal 204. This makes it possible to set up a communication connection 212 between the chip card 202 and the chip card 201. It is also conceivable that several dual-interface chip cards are located near the chip card 202 having the NFC interface 203 and to each of these chip cards a communication relation is set up.

A data exchange is effected between the chip cards 201 and 202 via the direct communication channel 212, which preferably begins with an authentication. By periodic repetition of the data exchange via the direct communication channel 212 the chip cards 201 and 202 can securely determine the presence of the respective other chip card.

A simple possibility is that the chip card 202 regularly sends a command to the chip card 201. The chip card 201 here can be equipped with a timer, which specifies a time within which the chip card 201 (dual-interface chip card) must output anew a command, in order to maintain the validity of the presence. In so doing, between the commands the RFID reader field 204 can also be switched off, because the chip card 201 is still supplied with operating voltage Vcc via its contact-type interface to the reading device 210.

An alternative possibility is that the chip card 202 having the NFC interface 203 sends a command to the card 201, which this, however, does not answer. Instead, in regular intervals a WTX request (waiting time extension) is sent to the chip card 202 having the NFC interface 203, which is answered by this by a WTX response. In this case, the RFID reader field 204 must be generated during the entire time.

If the RFID reader field 204 is permanently switched on and the chip card 202 having the NFC interface is removed from the reading device 210, then also the RFID reader field 204 is interrupted. This additional change can be directly captured by the chip card 201, so that the presence of the chip card 202 is recognized without a time delay.

A possible example of application of the systems represented in FIGS. 1 and 2 is the use in an electronic health card.

Here, there are cases of application in which it is necessary to determine the presence of a doctor, before data of the electronic health card can be accessed. For this purpose, between the electronic health card and the health professional card of the doctor an authentication must be carried out.

In the case of the embodiment variants described in FIG. 1 it is provided to equip the electronic health card and the health professional card respectively with a contactless interface as well as to provide the further communication means, thereby making possible a direct authentication between electronic health card and health professional card while circumventing the RFID reading device.

In the embodiment variant represented in FIG. 2 it is provided to equip the electronic health card preferably as a dual-interface chip card and the health professional card preferably as an NFC chip card. This also makes possible the direct authentication between electronic health card and health professional card while circumventing the reading device and its security module SMC-A.

By a periodic polling it can be ensured here that the health professional card has not left the region of the reading device. If the presence of the health professional card can no longer be determined by the electronic health card, the authentication and thus the access authorization of the reading device to certain, specified data in the electronic health card can again be locked.

The invention claimed is:

1. A system for the presence recognition of a second portable data carrier by a first portable data carrier, wherein each of the first portable data carrier and the second portable data carrier comprises:
    a contactless interface with an antenna and an electronic circuit configured to store or process data,
    wherein the system includes an RFID reading device that includes an antenna, wherein, in operation, a field is formed around the antenna and within the field the RFID reading device supplies the first portable data carrier or the second portable data carrier with energy and with a communication connection when the first portable data carrier or the second portable data carrier are nearby the RFID reading device,
    wherein, in the first data carrier and the second data carrier, a further communication device is respectively provided, via which an additional, direct communication channel, independent of the field of the reading device, is made available between the first data carrier and the second data carrier, to thereby enable checking for the immediate presence of the second data carrier in the field of the reading device by the first data carrier, and
    wherein the RFID reading device is permitted to read data stored in the first data carrier only when the presence of the second data carrier in the communication region of the direct communication channel have been proven by an authentication.

2. The system according to claim 1, wherein the further communication device of the first and second data carrier comprises an optical transceiver which is configured to send and receive in the infrared range.

3. The system according to claim 1, wherein the further communication device of the first and second data carrier is configured to send and receive electromagnetic signals on a frequency which is different from a frequency of the reading device.

4. The system according to claim 1, wherein the reading device is based on the ISO/IEC 14443 standard.

5. The system according to claim 1, wherein the first data carrier comprises a communication relation to the reading device and the second data carrier obtains at least energy from the field of the reading device.

6. The system according to claim 1, wherein a multiple communication between the first data carrier and the second data carrier is provided.

7. The system according to claim 1, wherein the first data carrier is permitted to carry out at least one of: specified commands and actions; to read; and to write on certain memory regions only when the presence of the second data carrier is positively checked by the first data carrier.

8. The system according to claim 1, wherein a direct authentication between the first and the second data carrier, while circumventing the reading device, is enabled.

9. The system according to claim 8, wherein the authentication is revocable when the presence of the second data carrier is not positively checked by the first data carrier.

10. A method for recognizing the presence of a second data carrier by a first data carrier using the system recited in claim 1, comprising the steps:
    supplying the first and the second data carrier with energy by the reading device; setting up a communication connection between the first data carrier and the reading device;
    setting up a communication connection between the second data carrier and the reading device;
    setting up an additional wireless communication channel independent of the reading device between the first and the second data carrier via a respective further communication device that recognizes the presence of the second data carrier by the first data carrier, and
    wherein the RFID reading device is permitted to read data stored in the first data carrier only when the presence of the second data carrier in the communication region of the direct communication channel have been proven by an authentication.

11. A system for the presence recognition of a second portable data carrier by a first portable data carrier, wherein each of the first portable data carrier and the second portable data carrier comprises:
    a contact-type interface and an electronic circuit configured to store or process data, wherein
    the first data carrier additionally comprises a contactless interface that is operable parallel to the contact-type interface,
    the second data carrier additionally comprises an NFC interface,
    the system further comprising a reading device that includes two contact-type interfaces, via which the first portable data carrier and the second portable data carrier are supplied with energy, and
    based on a spatial arrangement of the NFC interface and the second portable data carrier a wireless, direct communication connection between the contactless interface of the first portable data carrier and the second portable data carrier is enabled that enables checking for the immediate presence of the second data carrier by the first data carrier.

12. The system according to claim 11, wherein the interfaces of the reading device are spatially arranged relative to each other such that the main areas of the data carriers are arranged mutually parallel at a small distance apart.

13. The system according to claim 11, wherein the second data carrier is based on the ISO/IEC 18092 standard, as a result of which the data carrier has RFID reader functionality.

14. The method according to claim 11, wherein the first and the second data carrier are permanently supplied with energy by the reading device.

15. The system according to claim 11, wherein there is generatable by the second data carrier at least once, an RFID read field that establishes the communication connection with the first data carrier.

\* \* \* \* \*